Feb. 9, 1932.  C. GATTIE  1,844,818
AUTOMATIC SAFETY WHEEL LOCK FOR VEHICLES
Filed Aug. 18, 1928
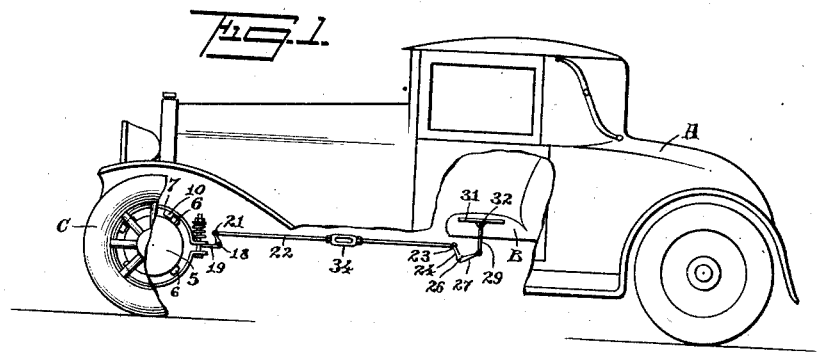
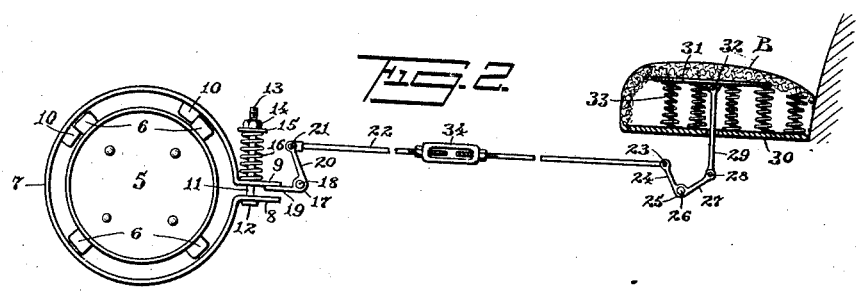
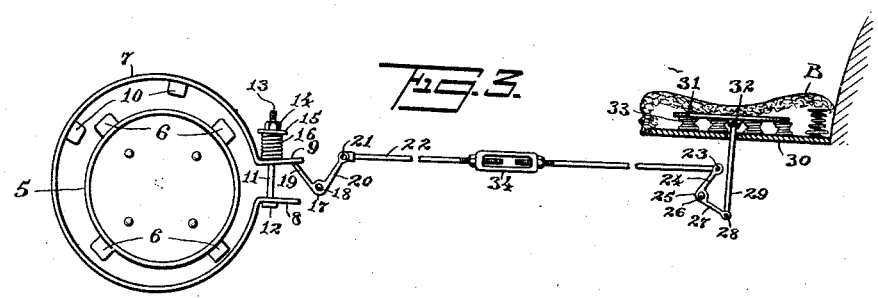
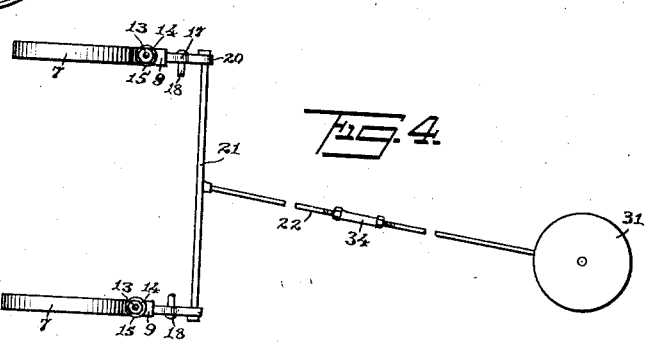
WITNESSES
INVENTOR
Charles Gattie
BY
ATTORNEY Patented Feb. 9, 1932

1,844,818

UNITED STATES PATENT OFFICE

CHARLES GATTIE, OF NEW YORK, N. Y.

AUTOMATIC SAFETY WHEEL LOCK FOR VEHICLES

Application filed August 18, 1928. Serial No. 300,523.

This invention relates to safety attachments for motor vehicles, and contemplates an improved means for automatically locking one or more of the wheels when the operator leaves the vehicle standing, whereby to prevent accidental movement of the same during the absence of the operator from his seat.

Many serious accidents involving personal injuries and property damage have resulted either from the failure of the operator to properly apply the emergency brake or due to accidental release of the same by vibration, by children or otherwise, especially where the vehicle is left standing by the operator on a hill.

In order to insure against such accidents and to provide automatically operable positive means for locking one or more of the vehicle wheels to prevent accidental movement of the same when the operator leaves the driver's seat, the present invention comprehends a wheel locking device which is releasable by the weight of the operator when seated in the driver's seat and which is rendered active by the operator immediately upon leaving his seat.

Other objects reside in the comparative simplicity of construction and mode of operation of the device, the economy with which it may be produced and installed on a vehicle and the general efficiency derived therefrom.

With the above recited and other objects in view, reference is had to the following description and accompanying drawings, in which there is exhibited one example or embodiment of the invention, while the claims define the actual scope of the same.

In the drawings—

Figure 1 is a fragmentary side view of an automobile equipped with a safety wheel locking device constructed in accordance with the invention and illustrating the same in its active applied position.

Figure 2 is a view on an enlarged scale illustrating the active position of the device.

Figure 3 is a similar view illustrating the inactive position of the device.

Figure 4 is a diagrammatic plan view of the device.

Referring to the drawings by characters of reference, A designates an automobile or motor vehicle, B the driver's seat which is of the ordinary spring cushion type and which is adapted to be depressed under the weight of the driver or operator. One or more of the vehicle wheels C is provided with a drum 5 which may serve the purpose of the brake drum, and said drum is provided with circumferentially spaced radially projecting lugs 6. A split band or annulus 7 surrounds the drum 5 and is provided at its split portion with outwardly projecting terminals 8 and 9, one of which is anchored and the other of which is free to move toward and away from the first mentioned terminal for the purpose of effecting radial contraction and expansion of the band or annulus. The band or annulus 7 is provided with a plurality of circumferentially spaced radial inwardly projecting detent lugs 10. A bolt or stem 11 extends through the extremities 8 and 9 and is provided with a head 12 at one end and which by way of example is shown as engaging with the terminal 8. The other end 13 is preferably threaded and has engaged thereover a nut 14 bearing against a washer 15, between which washer and the other terminal 9 a coiled expansion spring 16 is interposed which surrounds the bolt or stem 11. Under this construction and arrangement, it is obvious that the spring 16 normally functions to move the extremity 9 toward the extremity 8 for the purpose of contracting the band or annulus 7 whereby to dispose the detent lugs 10 on the band into the path of movement of the lugs 6 on the drum 5. In order to provide means for moving the extremity 9 away from the extremity 8 to expand the band or annulus 7 to dispose the detent lugs 10 out of the path of movement of the lugs 6 on the drum, a bell crank 17 fulcrumed at 18 is provided, the arm 19 of which bell crank engages with the terminal 9 of the band or annulus. The remaining arm 20 of the bell crank 17 is pivotally connected at 21 with a rod 22 which in turn is pivotally connected at 23 with the arm 24 of a bell crank 25 fulcrumed at 26. The remaining arm 27 of the bell crank 25 is pivotally connected at 28 with a push rod 29 which extends upwardly through the bottom wall 30 of the driver's seat cushion B. A plate 31 disposed within the confines of the driver's seat cushion B is pivotally connected at 32 to the upper end of the push rod 29 and is normally moved upwardly by the springs 33. If desired, for the purposes of adjustment, the rod 22 may be made in sections connected by a turn buckle 34.

In use and operation, the springs 33 function together with the spring 16 when the driver's seat is unoccupied to cause the band or annulus 7 to be contracted, as illustrated in Figures 1 and 2, so that the detent lugs 10 are disposed in the path of movement of the lugs 6 on the wheel drum 5. Obviously, this constitutes a positive lock for one or more of the wheels C of the vehicle so that accidental movement of the same is prevented when the driver's seat is unoccupied. In practice, the springs 33 and 16 are of sufficient strength to prevent release of the device by a child. When the driver occupies the driver's seat B, his weight will depress or contract the springs 33, effecting a downward movement on the push rod 29, a corresponding rocking movement of the bell cranks 25 and 17 and an expansion of the band 7 to dispose the detent lugs 10 out of the path of movement of the lug 6 on the wheel drum 5 to release the device. When the driver leaves the seat, however, and the springs 33 are relieved of his weight, the device is automatically rendered active to lock the vehicle wheel or wheels for preventing accidental movement of the same.

What I claim is:

1. A safety wheel locking attachment for land vehicles including a lug projecting radially outward from the axis of the wheel, a split annular member having circumferentially spaced radial inwardly projecting detent lugs adapted to coact with the wheel lug to lock the same against rotation upon contraction of said member.

2. A safety wheel locking attachment for land vehicles including a lug projecting radially outward from the axis of the wheel, a split annular member having circumferentially spaced radial inwardly projecting detent lugs adapted to coact with the wheel lug to lock the same against rotation upon contraction of said member and means for normally contracting said member to effect the locking of said wheel.

3. A safety wheel locking attachment for land vehicles including a lug projecting radially outward from the axis of the wheel, a split annular member having circumferentially spaced radial inwardly projecting detent lugs adapted to coact with the wheel lug to lock the same against rotation upon contraction of said member, means for normally contracting said member to effect the locking of said wheel and means operable by the weight of the driver of the vehicle for expanding said member to release the wheel.

4. A safety wheel locking attachment for land vehicles including a lug projecting radially outward from the axis of the wheel, a split annular member having circumferentially spaced radial inwardly projecting detent lugs adapted to coact with the wheel lug to lock the same against rotation upon contraction of said member, means for normally contracting said member to effect the locking of said wheel and means arranged within the driver's seat and operable by the weight of the driver of the vehicle for expanding said member to release the wheel.

5. A safety wheel locking attachment for motor vehicles including a drum secured to one of the wheels, a lug projecting radially outward from said drum, a split band surrounding said drum having circumferentially spaced radial inwardly projecting detent lugs adapted to coact with the lug on said drum to lock the wheel against rotation upon contraction of said band with respect to said drum and means for normally contracting said band to dispose the detent lugs in the path of movement of the drum lug.

6. A safety wheel locking attachment for motor vehicles including a drum secured to one of the wheels, a lug projecting radially outward from said drum, a split band surrounding said drum having circumferentially spaced radial inwardly projecting detent lugs adapted to coact with the lug on said drum to lock the wheel against rotation upon contraction of said band with respect to said drum, means for normally contracting said band to dispose the detent lugs in the path of movement of the drum lug and means arranged within the driver's seat and operable by the weight of the driver of the vehicle for expanding said band to dispose the detent lugs out of the path of movement of the drum lug for releasing said wheel.

CHARLES GATTIE.